United States Patent Office 3,448,507
Patented June 10, 1969

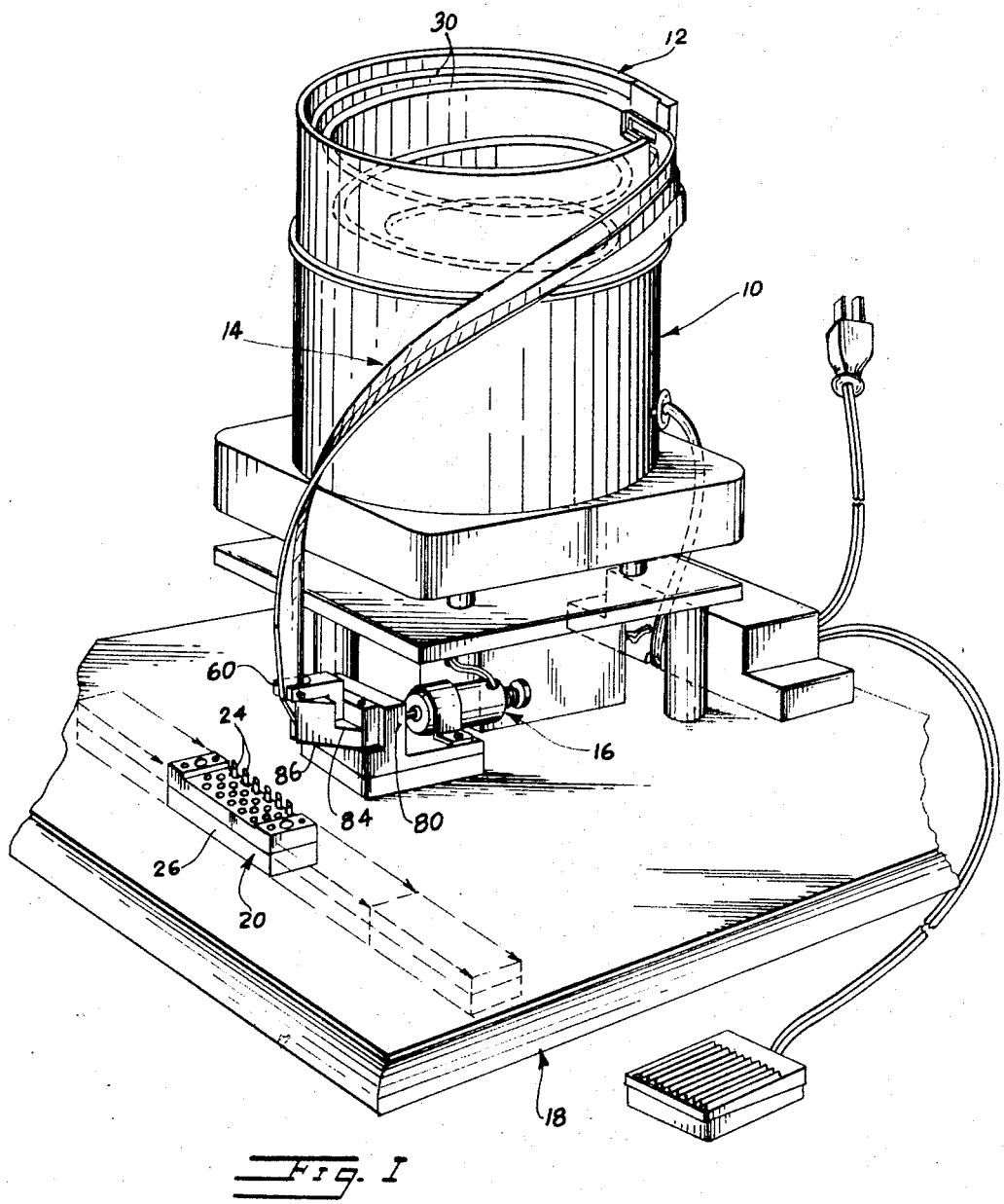
Fig. I
INVENTORS.
BORIS A. JACKSON
STEPAN NALBANTIAN
BENEDETTO REMONDINO
BY
ATTORNEY

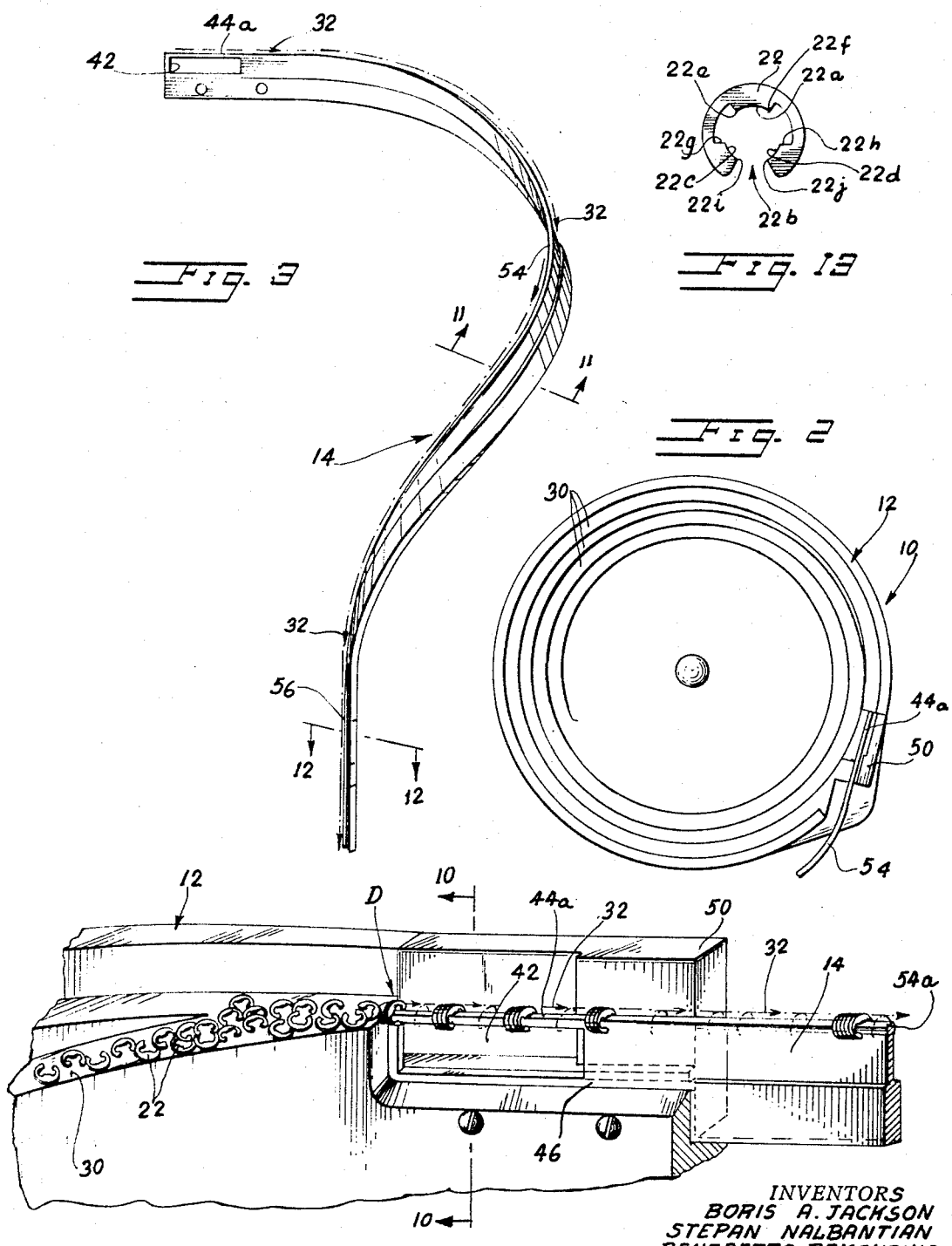

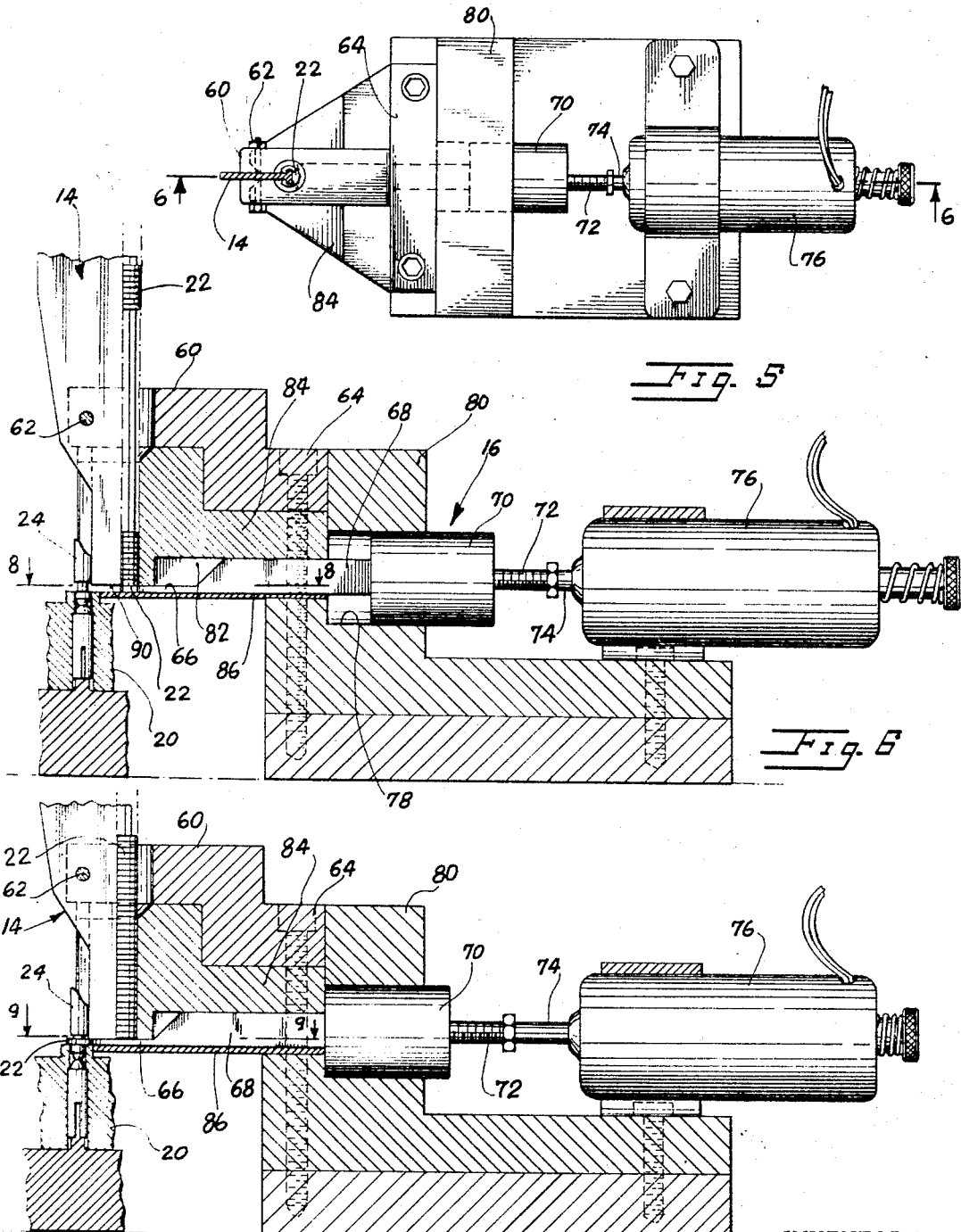

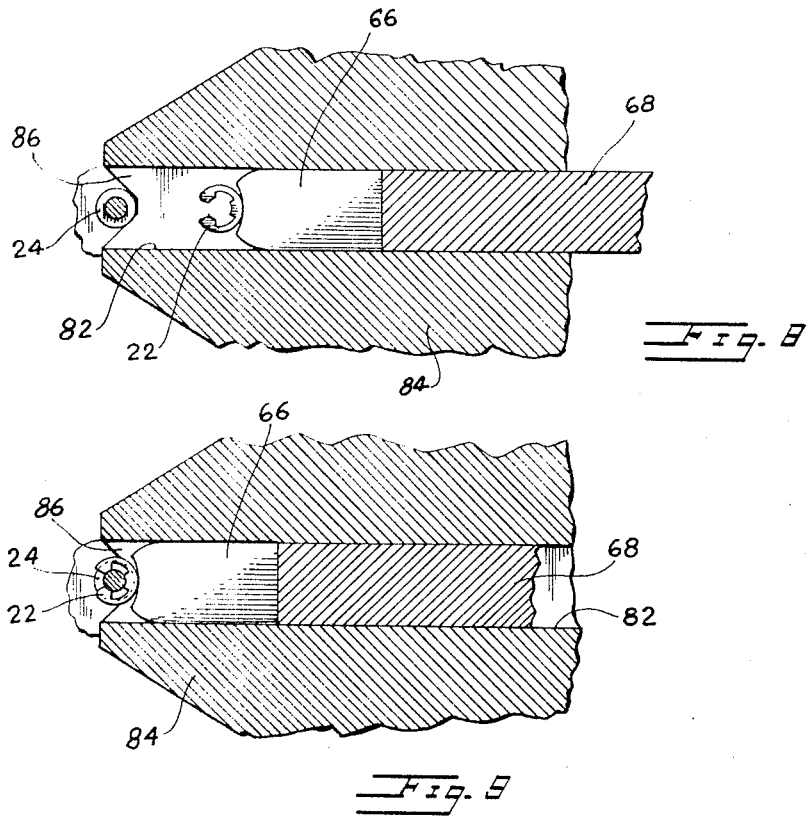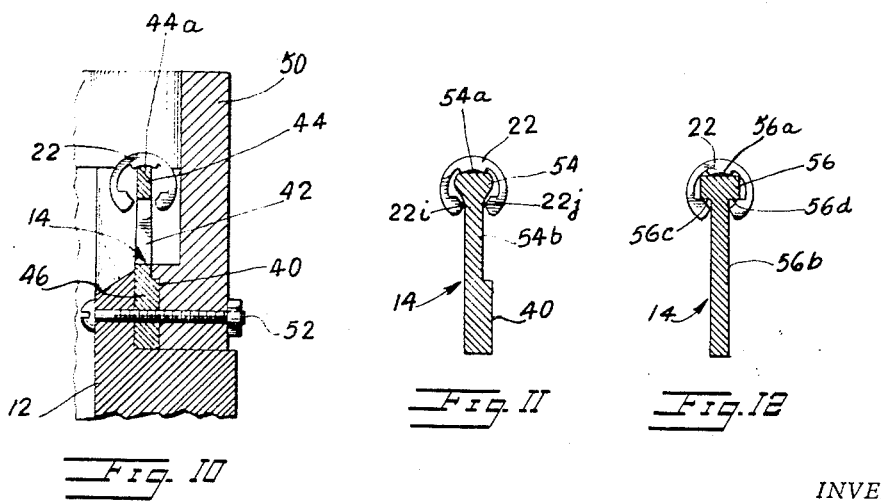

3,448,507
CLIP FEEDING AND ATTACHING MACHINE
Boris A. Jackson, Manhasset, Stepan Nalbantian, Massapequa, and Benedetto Remondino, New York, N.Y., assignors to U.S. Components Inc., Bronx, N.Y.
Filed Apr. 14, 1967, Ser. No. 630,944
Int Cl. B23q 7/10; B65g 47/26
U.S. Cl. 29—211                    10 Claims

ABSTRACT OF THE DISCLOSURE

A machine which continuously feeds C-clips from a hopper to a vibratory spiral guide rail and then to a clipping tool, said guide rail first aligning the C-clips relative to each other and thereafter reorienting them into operative position relative to the work, and said clipping tool then attaching the aligned and reoriented C-clips to individual work elements.

BACKGROUND OF THE INVENTION

Field of the invention

The invention may be applied to any field in which C-shaped clips are used, particularly those fields in which C-clips of relatively small proportions are manually handled and applied. Illustrative is the field of electrical connectors of multi-contact type.

Description of the prior art

The closest art known to applicants are the following patents: 2,790,534, 2,858,008, 3,031,060, 3,084,780, 3,114,448, 3,125,208.

SUMMARY OF THE INVENTION

The invention comprises the following major components which are mechanically and functionally interconnected to perform the operation of continuously transporting a plurality of C-clips from a quantity source of such clips in random relationship, aligning them with respect to each other, reorienting them with respect to the work and then individually clipping them upon individual work elements: A vibratory hopper which contains a quantity of C-clips and feeds them in random relationship to a discharge station, a vibratory spiral guide rail which receives and aligns the C-clips and then reorients them with respect to the work, and a tool which individually engages the C-clips and clips them to individual work elements.

The vibratory hopper feeds the C-clips in random relationship to the discharge station. Pursuant to the laws of chance some of these clips will ride up upon the guide rail and others will drop back into the hopper. There is however a sufficient flow of randomly oriented C-clips to provide for a relatively continuous transfer of clips to the guide rail. The guide rail aligns the clips with respect to each other. Its spiral shape enables the guide rail to reverse the positions of the clips so that they may be presented to the work elements in proper orientation for the clipping operation. The spiral guide rail is itself a vibratory element. In the preferred form of the invention the spiral guide rail is mechanically connected to the vibratory hopper and derives its vibratory action therefrom. It is this vibratory action which enables the spiral guide rail to feed the clips in aligned relationship from the vibratory hopper to the tool. In the preferred form of this invention the tool is a solenoid actuated ejector which individually engages the clips and thrusts them upon the work. This is a reciprocatory action, switch actuated, and manually or pedally controlled.

BRIEF DESCRIPTION OF THE DRAWING

FIGURE 1 is a perspective view of the entire machine showing a connector block on the base of the machine preparatory to movement into clip affixing position.

FIGURE 2 is a top view of the vibratory hopper of FIGURE 1, showing a portion of the vibratory guide rail which is connected thereto.

FIGURE 3 is a perspective view of the vibratory guide rail showing its spiral curvature.

FIGURE 4 is an enlarged fragmentary view partly in section showing how the guide rail is attached to the vibratory hopper to receive C-clips therefrom.

FIGURE 5 is a top view of the clip affixing tool of FIGURE 1, the guide rail being shown therein in horizontal section.

FIGURE 6 is an enlarged vertical section on the line 6—6 of FIGURE 5, the solenoid actuated tool being shown in retracted position.

FIGURE 7 is a sectional view similar to that of FIGURE 6 showing the solenoid actuated tool in clipping position.

FIGURE 8 is an enlarged fragmentary horizontal section on the line 8—8 of FIGURE 6.

FIGURE 9 is an enlarged fragmentary horizontal section on the line 9—9 of FIGURE 7.

FIGURE 10 is an enlarged fragmentary section on the line 10—10 of FIGURE 4.

FIGURE 11 is another section on the line 11—11 of FIGURE 3.

FIGURE 12 is still another section on the line 12—12 of FIGURE 3.

FIGURE 13 is an enlarged plan view of a C-clip illustrative of the many kinds of C-clips to which the present invention relates.

DESCRIPTION OF A PREFERRED EMBODIMENT OF THE INVENTION

As shown in FIGURE 1 a machine 10 made in accordance with the principles of this invention comprises a vibratory hopper 12, a vibratory spiral guide rail 14, a solenoid actuated tool 16 and a base 18 supporting said hopper, guide rail and tool and also the work 20. In the preferred embodiment of the invention the machine is adapted to feed C-shaped clips 22 from the hopper, along the guide rail, to the tool, which individually applies such clips to electrical connectors 24 on block 26. These electrical connectors comprise the "work" above mentioned. C-clips 22 come in various sizes and shapes, some less than one-eighth of an inch in outside diameter and wafer thin. They are extremely difficult to handle manually and tweezers and magnifying lenses are frequently used in this connection. Securing C-clips of such minuscule size to electrical connectors of the type shown in FIGURE 1 is a tedious, time-consuming and nerve-racking operation when manually performed. It was for the purpose of relieving assembly personnel of the burden of this work that the present machine was invented.

The vibratory hoper 12 may be of conventional construction, being provided with an internal helical ramp 30. As the hopper vibrates the C-clips are caused to ride up the helical ramp 30 until they reach the discharge station D at which point the vibratory spiral guide rail 14 is attached to the vibratory hopper.

It will be noted that it is the upper end of the vibratory guide rail which is attached to the vibratory hopper at discharge station D. At random some of the C-clips thread themselves upon the end of the vibratory guide rail and the vibrations therein cause them to move along the rail and then to descend with it in the direction of arrows 32 in FIGURES 3 and 4.

It will now be noted that the guide rail has different cross-sectional shapes along its length. At the point where the guide rail is secured to the vibratory hopper said guide rail has a simple rectangular cross-sectional shape with a somewhat thicker base 40. This is clearly shown in FIGURE 10. Additionally a rectangular cut-out 42 is provided in the guide rail adjacent its line of juncture with the vibratory hopper, thereby forming a relatively narrow upper rail component 44 and a relatively wide lower rail component 46. This construction facilitates threading of the C-clips upon the guide rail. Many C-clips will fail to mount the guide rail or will fall off the guide rail before they are fully threaded thereon. Opening 42 may in such case serve as a window through which unthreaded C-clips may fall back into the hopper.

The means for securing the guide rail to the hopper is best shown in FIGURES 4 and 10. It will be noted that a clamp block 50 secures the lower section 46 of the guide rail to hopper 12 by means of bolts 52. The shoulder in said lower section of the guide rail serves to key the guide rail to the hopper so as to position the guide rail with great accuracy and precision relative to the discharge end of ramp 30 of the vibratory hopper. Continuous, uninterrupted transfer is thereby provided between the hopper ramp and the upper section 44 of the vibratory guide rail.

The manner in which the C-clips thread themselves upon the guide rail is shown in FIGURES 4, 10, 11 and 12. Illustrative C-clip 22 (FIGURE 13) has several well-defined inner edges and corners which may serve as bearing surfaces relative to the guide rail. Specifically, C-clip 22 is provided with three arcuate edges 22a, 22c and 22d which are formed in concentric relationship. Arcuate edge 22a lies opposite clip opening 22b and the other two arcuate edges flank said opening.

Corners 22e and 22f defining the ends of arcuate edge 22a lie in a plane which parallels a plane containing aligned shoulders 22g and 22h at the upper ends of arcuate edges 22c and 22d. Corners 22i and 22j at the lower ends of said arcuate edges 22c and 22d define the narrow neck of opening 22b of the clip.

When the clips thread themselves upon the upper section 44 of the guide rail, arcuate edge 22a rides upon the upper edge 44a of the guide rail. There is sufficient clearance between the other inner surfaces of the clip and the other outer surfaces of section 44 to enable the clip to slide or rock in transverse direction on section 44 in order to seek a stable seat thereon. This is part of the process of threading.

As the clips move along the guide rail, a gradual process of locking the clips to the guide rail takes place. This is effected by closing off opening 42 and enlarging—that is widening—the upper section 44 of the guide rail in order to form bead 54. This bead has a relatively wide upper surface 54a which serves as a bearing relative to inner corners 22e and 22f of the clip. The bead is now too wide to pass through the opening 22b and consequently shank 54b below the bead serves as a stabilizing bearing between inner points 22i and 22j of the clip. There still however remains sufficient clearance between other inner portions of the clip and other outer portions of bead 54 to facilitate movement of the clip along the guide rail. Nevertheless by the time the several clips reach that section of the guide rail which is illustrated in FIGURE 11, they are fully aligned with each other.

By the time the clips reach the lowermost end of the guide rail where they are to be applied to the work, it is important that they be precisely oriented both with respect to the work and with respect to the tool which affixes them to the work. This is effected by a progressive change in shape from the relatively rounded bead 54 shown in FIGURE 11 to the rectangular bead 56 shown in FIGURE 12. At the point illustrated by FIGURE 12 the bead and its shank 56b which comprise the guide rail define a T-shaped configuration wherein the upper surface 56a of the cross member of the T engages corners 22e and 22f of the clip and the lower surfaces 56c and 56d of said cross member of the T engage shoulders 22g and 22h of the clip. Points 22i and 22j of the clip engage the opposite sides of shank 56b. The clips are now very precisely aligned and oriented for the next step in the process.

The lower end of the guide rail is secured to a block 60 on the tool unit 16 by means of a bolt 62. This block 60 and other housing sections of tool 16 are secured to base 18 by means of bolts 64 or other suitable fastening means. Once the lower end of the guide rail is clamped to the tool block the guide rail is precisely fixed relative to the tool which secures the clips to the work.

This tool comprises a blade 66 which is secured to or integral with a bar 68 on bushing 70. This bushing is adjustably secured by means of screw shaft 72 to plunger 74 of solenoid 76. Bushing 70 rides within a sleeve 78 in block 80 of the tool and bar 68 rides within channel 82 formed between block 84 and plate 86 of the tool. Blade 66 rides within a narrower channel formed between an enlargement of block 84 and plate 86. The thickness of blade 66 corresponds to the thickness of the individual C-clips 22.

In the operation of this device the C-clips are fed from the lower end of guide rail 14. There is a space 90 between said lower end of the guide rail and plate 86 and said space provides sufficient clearance for the passage of only one C-clip at a time. Since blade 66 is of the same thickness as a single C-clip it will be understood that space 90 will also provide passage for said blade.

It will be observed in FIGURES 8 and 9 that tool block 84 tapers to relatively narrow proportions and is provided with a generally V-shaped receptacle 86 at its tapered end. This V-shaped receptacle is adapted to receive and center an electrical connector 24. It will be seen in FIGURE 8 that the forward end of blade 66 is rounded to engage the rounded outer periphery of C-clip 22. This tends to center the C-clip when the blade engages it as shown in FIGURE 8 and then pushes it into engagement with connector 24 as shown in FIGURE 9.

The foregoing is illustrative of a preferred form of this invention. It will, of course, be understood that this preferred form may be modified and other forms may be provided within the broad scope of the invention and the appended claims. For example the particular type of hopper which is shown in the drawing is not critical with respect to the present invention. Other types of hoppers may be used. Similarly the particular clipping tool which is shown in the drawing is not critical. Other types of clipping tools may be used to equal advantage. Similarly the particular spiral configuration of the guide rail as illustrated in the drawing is not critical since other spiral configurations may be employed in connection with other arrangements of the components of this invention. For example the work may be presented to the clipping tool in a vertical rather than a horizontal direction. This could call for a different spiral configuration of the guide rail and a different orientation of the C-clips.

What is claimed is:

1. A machine for feeding and affixing C-clips and the like, comprising:
    a feed hopper,
    a clipping tool, and
    a vibratory guide rail leading from said hopper to said tool,
whereby C-clips are fed from the hopper to the tool for affixation.

2. A machine in accordance with claim 1, wherein:
    the feed hopper is of the vibratory type, transmitting its vibrations to the guide rail.

3. A machine in accordance with claim 2, wherein:
    the vibratory feed hopper feeds C-clips to the vibratory guide rail in vertical orientation, open side down,
    said vibratory guide rail being spirally shaped to reposition the C-clips and to feed them to the clipping tool in horizontal orientation, open side forward.

4. A machine in accordance with claim 3, wherein:
the guide rail is formed with gradually varying cross-sectional configuration and proportions progressively approaching the inside configuration and proportions of the C-clips.

5. A machine in accordance with claim 4, wherein:
the receiving end of the guide rail is of relatively small proportions to provide sufficient clearance between its bearing surfaces and the bearing surfaces of the C-clips to facilitate movement of the C-clips onto the guide rail.

6. A machine in accordance with claim 5, wherein:
the clip bearing portion of the receiving end of the guide rail is rectangular in cross-section with reduced vertical and horizontal proportions to receive the C-clips in loose-fitting relationship,
whereby the clips are enabled to drop onto the guide rail and adjust to relatively aligned positions.

7. A machine in accordance with claim 6, wherein:
the clip bearing portion of the discharge end of the guide rail is of T-shaped formation in cross-section to provide multiple bearing surfaces conforming to and engaging the inner bearing surfaces of the clips, whereby the clips are precisely aligned relative to each other and accurately oriented relative to the work.

8. A machine in accordance with claim 7, wherein:
the clip bearing portion of the guide rail intermediate its rectangular and T-shaped cross-sectional formations is provided with a rounded bead having plural bearing surfaces to engage the inside bearing surfaces of the clips and to align them with each other.

9. A machine in accordance with claim 8, wherein the clipping tool comprises:
a work positioning element,
a clip slideway between the discharge end of the guide rail and said work positioning element, and
a clip-engaging blade mounted for reciprocating movement within said slideway toward and away from said work positioning element,
whereby the clips are individually moved by the blade into clipping engagement with the work.

10. A machine in accordance with claim 9, wherein:
a solenoid is connected to the clip-engaging blade to thrust it forwardly in clip-engaging and affixing direction, and to retract it rearwardly in recycling direction.

References Cited
UNITED STATES PATENTS 2,791,874 5/1957 Furst _____ 221—159 XR
3,082,886 3/1963 Maude _____ 198—33.1 XR

FOREIGN PATENTS 1,146,090 5/1957 France.

THOMAS H. EAGER, *Primary Examiner.*

U.S. Cl. X.R.

29—229; 193—43; 198—33